United States Patent [19]

Papayoti

[11] Patent Number: 5,735,045
[45] Date of Patent: Apr. 7, 1998

[54] METHOD FOR REFURBISHING A JET ENGINE

[75] Inventor: Basil Papayoti, Plano, Tex.

[73] Assignee: GASI Engine Services Corporation, Miami, Fla.

[21] Appl. No.: 815,498

[22] Filed: Mar. 11, 1997

Related U.S. Application Data

[62] Division of Ser. No. 592,960, Jan. 29, 1996, abandoned.

[51] Int. Cl.$^6$ ..................................................... B23P 15/00
[52] U.S. Cl. .................................... 29/889.1; 29/402.06
[58] Field of Search ............................ 29/889.1, 402.08, 29/402.03, 402.04, 402.05, 402.06, 888.021

[56] References Cited

U.S. PATENT DOCUMENTS

| | | |
|---|---|---|
| 4,741,128 | 5/1988 | Reaves et al. . |
| 4,805,282 | 2/1989 | Reaves et al. . |
| 4,808,055 | 2/1989 | Wertz et al. . |
| 4,822,248 | 4/1989 | Wertz et al. . |
| 4,832,252 | 5/1989 | Fraser . |
| 4,884,326 | 12/1989 | Porter et al. .................. 29/889.1 |
| 5,193,736 | 3/1993 | Marijnissen et al. . |
| 5,205,465 | 4/1993 | Bogard et al. . |
| 5,430,935 | 7/1995 | Yaworsky et al. . |
| 5,448,828 | 9/1995 | Willems et al. . |
| 5,655,701 | 8/1997 | Quattrocchi et al. .......... 29/889.1 |

*Primary Examiner*—Irene Cuda
*Attorney, Agent, or Firm*—Haynes and Boone, L.L.P.

[57] ABSTRACT

A method and apparatus for restoring the compressor rotor path rings of a jet engine according to which the rings are removed from the inner surface of the compressor housing and are installed into a jig. The rings are machined down a predetermined amount and a coating of wear-resistant material is applied to their outer surfaces. The rings are then reinstalled into the jig and machined down to the precise thickness after which they are reinstalled into the compressor housing.

6 Claims, 2 Drawing Sheets

METHOD FOR REFURBISHING A JET ENGINE

This is a divisional of application Ser. No. 08/592,960 filed on Jan. 29, 1996 abn.

BACKGROUND OF THE INVENTION

The present invention relates to a method and apparatus for refurbishing a jet engine and, more particularly, to such a method and apparatus in which the rotor path linings of the compressor section of the engine are removed from the compressor case, refurbished and returned to the case.

In the operation of a jet engine, ambient air is taken into the engine housing, compressed, heated by the combustion of fuel and then expanded in a turbine. Since the air and combustion gases are expelled from the jet at a much higher velocity than the intake velocity, a propulsive thrust is generated.

Each jet turbine engine is provided with a multistage axial compressor which draws in the air, passes the air through a plurality of air vanes which direct the air through alternate sets of rotating blades and stationary stators, or air vanes, to compress the air. The compressed air is passed from the compressor into a combustion chamber along with fuel and, when the fuel is combusted, the rise in temperature produces a considerable increase in the volume and pressure, of the gases, which are expelled through an exhaust nozzle at the rear of the engine to produce the propulsive thrust.

A high maintenance aspect of the jet turbine engine involves the rotating blades in the aforementioned compressor portion of the engine. More particularly, rotor path rings, or rings, are provided in a very closely spaced relation to the rotating blades and are machined to very close tolerances to provide a precise clearance (such as 0.0030 inch) through which the air passes to provide the compressive action on the air. However, with use, it is very difficult to maintain these precise clearances for several reasons. For example, the compressor case, or housing, is relatively flimsy and is subjected to tremendous external forces when in use which often causes the rotor blades to rub against the rings. Also, the blades rotate at very high speeds for long lengths of time and the ambient air being compressed is often laden with polluents. As a result, the outer, wear-resistant coating on the rings, which is usually plasma, peels, or wears, away.

Therefore periodic maintenance must be performed on the rotor blades and the rings to restore the above-mentioned clearances. Although the rotor blades can be retipped fairly easily, problems exist with respect to restoring each liner to its original thickness. More particularly, the current procedure involves initially removing the above-mentioned air vanes from the compressor housing, then removing the rings and soaking the rings in an acid bath, or the like, for approximately three days to remove the plasma coating on the surface of the rings. Then a full new coat of plasma is applied to the liner, the restored liner is reinstalled in the compressor housing, and the liner is machined to proper dimensions. The air vanes, which had to be removed to accommodate the machining rig, are then reinstalled in the housing.

There are several problems involved with the above procedure. For example, the removal and reinstallation of the air vanes is very labor intensive. Also, the time required to soak the rings to remove the old plasma coating delays the procedure. Further, the step of machining the rings to the precise thickness in the compressor housing is problematical since the housing is relatively flimsy and can cause errors, in the form of out-of roundness, etc. in the machining process. Therefore, what is needed is a procedure and associated structure for restoring the compressor rotor path lines which is relatively quick, less labor intensive and more accurate.

SUMMARY OF THE INVENTION

The present invention, accordingly, provides a method and apparatus for restoring the compressor rotor path rings of a jet engine which is relative quick, less labor intensive and more accurate. To this end the rings are removed from the inner surface of the compressor housing and are installed into a jig, the inner surface of which replicates the inner surface of the compressor housing. The rings are machined down a predetermined amount and a coating of wear-resistant material is applied to their outer surfaces. The rings are then reinstalled into the jig and machined down to the precise thickness after which they are reinstalled into the compressor housing.

Thus, major advantages are achieved with the system and method of the present invention since the air vanes do not have to be removed from the compressor housing, the three-day soaking period is eliminated and the rings can be machined with relatively high accuracy.

DESCRIPTION OF THE PREFERRED EMBODIMENT

Figure 1:
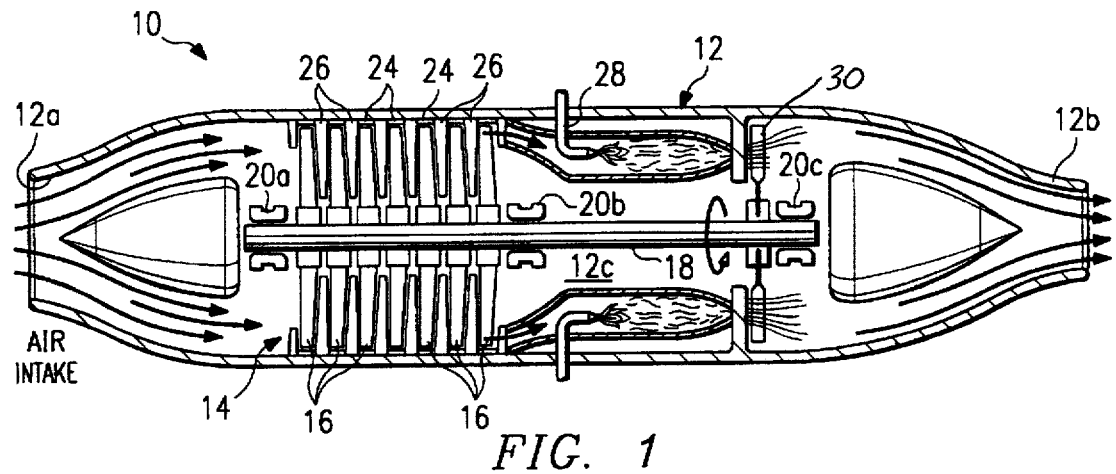
FIG. 1 is a schematic view of a jet engine.

Referring to FIG. 1 of the drawings, the reference numeral 10 refers in general, to a conventional jet engine which includes an elongated, hollow housing 12 having an air inlet opening 12a in its front end for receiving ambient air and a gas discharge nozzle 12b in its rear end. A combustion chamber 12c is defined in the housing 12 between the inlet 12a and the outlet 12b, and a compressor 14 is disposed in the front portion of the housing 12 between the inlet 12a and the combustion chamber 12c for receiving the air entering the housing through the inlet. The compressor 14 includes a plurality of axially-spaced rows of rotor blades 16 mounted on a shaft 18 which is rotatably mounted in three bearing/mount assemblies 20a, 20b, and 20c spaced along the housing 12 and mounted in the housing in any conventional manner. Although only two blades 16 in each row are shown, it is understood that each row contains a plurality of blades that are not shown, with the blade extending in an angularly-spaced relationship.

A plurality of rotor blade rings 24 are mounted in a plurality of circumferentially-extending, axially spaced grooves formed in the inner surface of the housing 12. The rings 24 extend in a closely-spaced relationship with the tips of the blades 16 to compress the air as it passes therebetween, as will be described.

A plurality of axially spaced rows of air vanes 26 are mounted to the inner wall of the housing 12 and project radially inwardly. Each row of air vanes 26 comprises a plurality of angularly-spaced vanes (two of which are shown) extending between adjacent blades 16 in an alternating, spaced relationship. The air vanes 26 are rotatable about their axes in a manner to be described to regulate the flow of air through the housing 12.

A plurality of fuel nozzles 28 (two of which are shown) are mounted in the housing 12 for introducing fuel into the combustion chamber 12c which is combusted in the presence of the air from the compressor 14. A turbine 30 is mounted on the shaft 18 in the path of the air and gases of combustion in the combustion chamber 12c and is driven by the air and gases to rotate the shaft 18 and therefore the blades 16, all in a conventional manner.

Thus, air is drawn in the inlet 12a of the housing 12 and passes through the compressor 14 and, more particularly, through the spaces between each rotating blade 16, its corresponding vanes 26 and ring 24 to compress the air before it passes to the combustion chamber 12c. Fuel is introduced into the combustion chamber 12c through the nozzles 28 and combusts in the presence of the air, and the resulting high-pressure combustion gases drive the turbine 30 and exit through the discharge nozzle 12b to produce propulsive thrust.

Figure 2:
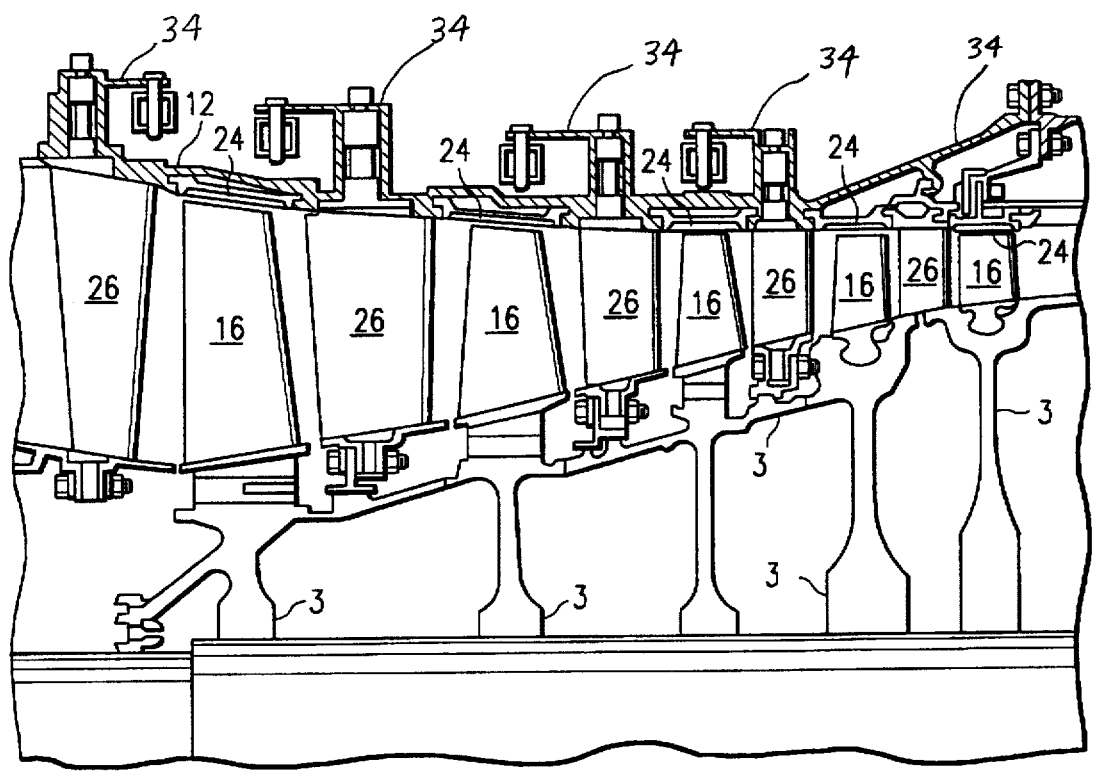
FIG. 2 is a partial elevational view of a portion of the compressor section of the jet engine of FIG. 1.

It is understood that the above-identified components are shown only schematically in FIG. 1 and a more accurate representation of the configuration of the blades 16, the rings 24 and the air vanes are shown in FIG. 2.

More particularly, the radius of a portion of the inner wall of the housing 12 shown in FIG. 2 decreases along the length of the member in a direction from the inlet 12a to the discharge nozzle 12b of the housing 12b, in order to progressively compress the incoming air as it passes through the compressor 14. Therefore, the lengths of the blades 16 and the vanes 26, as well as the width, or height, of the rings 24 decrease progressively in the same direction. Also, the angular disposition of the rings 24 relatively to the corresponding inner wall portion of the housing 12 varies depending on the particular location of the rings in the compressor section 14. It is understood that the above-mentioned variations in radius, blade length and ring size are not necessarily present with respect to other portions of the compressor 14 which are not shown in FIG. 2.

A mounting mechanism 32 is associated with each blade 16 for mounting the blades relative to the shaft 18, and the vanes 26 are rotatably mounted relative to the housing 12 for rotation about their longitudinal axes by means of a rotating mechanism 34 associated with each vane. The mechanisms 32 enable the blades 16 to be precisely located relative to their corresponding rings 24 so that, during rotation of the blades a vary narrow gap extends between each blade and its corresponding ring 24 to promote the compression of the air passing therebetween. The rotating mechanisms 34 enable the vanes 26 to be rotated about their longitudinal axes to vary the air flow to the blade 16 immediately downstream from each vane to precisely control the flow of air through the compressor 14. Since the specific construction of the mechanisms 32 and 34 do not form any part of the present invention, they will not be described in detail. It is noted that the mechanisms 32 are different in size and configuration depending on their particular location in the housing 12 for the reasons set forth above, which is also true with respect to the mechanisms 34.

Although not clear from the drawings it is understood that the housing 12 is formed of two arcuate members each extending for 180 degrees which are fastened together in any known manner. The grooves in each segment align when the assembled, and each ring 24 can consist of multiple arcuate segments (hereinafter referred to as "rings") extending end-to-end for the complete circumference of the aligned grooves. This permits relatively easy access to the interior of the housing 12 and the rings 24 for reasons to be described.

According to the technique of the present invention, when the rings 24 are worn down a predetermined amount during use, they are removed from the inner surface of the housing 12. This is done by disconnecting the two arcuate portions of the housing 12 and removing the rings 24 from the corresponding grooves formed in the inner walls of the housing portions while the air vanes 26 are kept in place.

Figure 3:
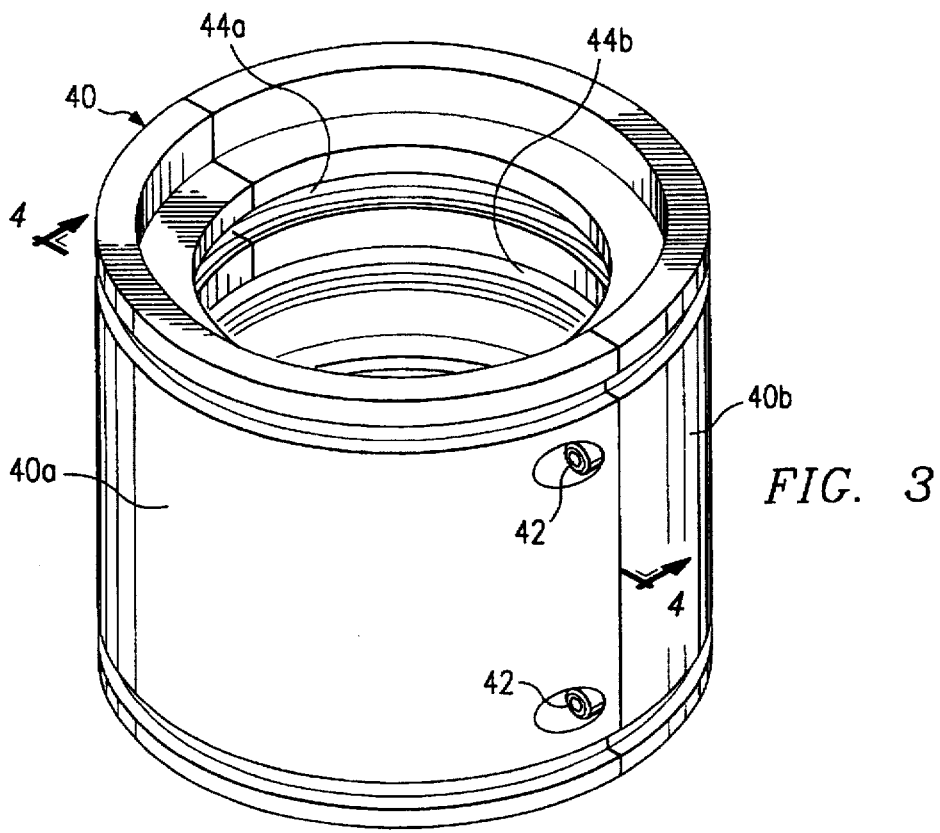
FIG. 3 is a perspective view of the jig used in the method of the present invention.

The rings 24 are then installed into a cylindrical, hollow jig 40 shown in FIG. 3 which is also formed of two arcuate members each extending for 180 degrees and fastened together by fasteners 42 in a conventional manner to permit easy access to the interior of the jig 40. A plurality of circumferential grooves, two of which are shown by the reference numerals 44a and 44b, are machined in the inner wall of the jig 40 which grooves replicate the above-mentioned grooves formed on the inner wall of the housing 12.

Figure 4:
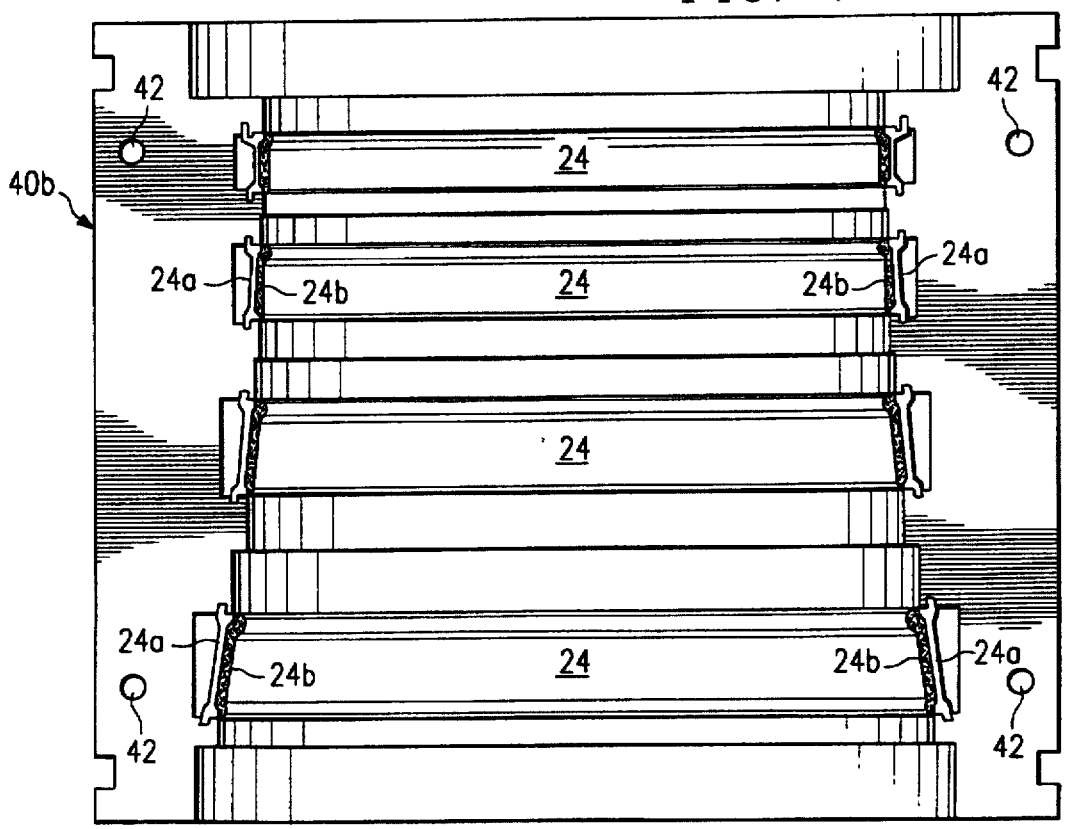
FIG. 4 is a developed view of an inner wall portion of the jig of FIG. 3.

A plurality of rings 24 are shown mounted in corresponding grooves, including the grooves 44a and 44b, in the half portion 40b of the jig 40 in FIG. 4. Each ring 24 consists of a base plate 24a which receives a coating 24b of wear-resistant material some of which is worn down during use. It is noted that the longitudinal edges of each base plate 24a are formed to fit in corresponding notches (not shown) formed in the corresponding surfaces of the inner wall of the housing 12 that define the grooves, including the grooves 44a and 44b, to secure the rings 24 in the grooves. After installation in the jig 40, the rings 24 are machined down to remove all of the remaining coating 24b. This can be done any conventional manner using a grinding or scraping tool, or the like.

Each stripped ring 24 is then removed from the jig 40 and a new coating of wear-resistant material is applied to its outer surface. The rings 24 are then reinstalled into their corresponding grooves, including the grooves 44a and 44b in the jig 40 and are machined down to the precise thickness required to establish the predetermined gap between the rings and the tips of the blades 16, with the relatively thick-walled jig providing excellent support for the machining operation. After the machining is complete, the rings are reinstalled into their original corresponding grooves in the housing 12. Since the grooves formed in the jig 40 are identical to the grooves in the housing 12 it is thus assured that the critical thickness of each ring 24 will conform to its original specification. (In this context, it is noted that the tips of the blades 16 also may be treated to restore the blades to their original specifications—a technique that forms no part of the present invention).

Thus, according to the present invention, the problems associated with the prior are techniques are eliminated including the removal and reinstallation of the air vanes, the excessive time required to soak the rings to remove the old plasma, and the inaccurate step of machining the rings to the precise thickness in the compressor housing.

A comparison of this technique to the prior art is as follows:

| PRIOR ART | PRESENT INVENTION |
| --- | --- |
| 1. Remove air vanes* | Not necessary |
| 2. Remove rings | Remove rings** |

-continued

| PRIOR ART | PRESENT INVENTION |
| --- | --- |
| 3. Soak rings in bath for 3 days to strip rings | Install rings in jig 40 and machine down |
| 4. Add coating of plasma to rings | Add coating of plasma to rings |
| 5. Reinstall rings in housing | Reinstall rings in jig 40 |
| 6. Machine rings to proper dimensions*** | Machine rings to proper dimensions |
| 7. Reinstall air vanes* | Reinstall rings in housing** |

*very labor intensive
**air vanes 26 remain in housing 12
***flimsy housing causes out-of roundness Thus, it is apparent from the above that the major problems prevalent with prior art techniques discussed have been eliminated with the present invention.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method of restoring rotor path rings disposed on the inner surface of the housing of a jet engine, said method comprising the steps of removing the rings from the inner surface of the compressor housing, then mounting the rings into a hollow cylindrical jig, the inner surface of which replicates the inner surface of the housing, then machining the rings to a predetermined thickness, and then reinstalling the rings into the housing.

2. The method of claim 1 further comprising the step of adding a coating of wear-resistant material to the rings after said step of removing and before said step of mounting.

3. The method of claim 2 wherein the rings include a coating of wear-resistant material some of which is worn off in use, and further comprising the step of taking off the remaining portion of the coating after the step of removing and before the step of adding.

4. The method of claim 3 wherein said step of adding comprises the step of installing a new wear-resistant coating on the plate of a thickness greater than the thickness after the step of machining.

5. The method of claim 1 wherein the compressor portion of the jet engine includes a plurality of vanes and wherein the steps of removing and reinstalling are done while maintaining the air vanes in the housing.

6. The method of claim 1 wherein the rings are installed in corresponding grooves formed in the inner surface of the housing and where the jig has grooves formed in its inner wall that replicate the grooves in the housing.

* * * * *